United States Patent
Lee et al.

(10) Patent No.: US 9,635,078 B2
(45) Date of Patent: Apr. 25, 2017

(54) SERVER, USER TERMINAL APPARATUS, AND METHOD FOR PROVIDING STREAMING DATA SERVICE

(71) Applicant: SAMSUNG ELECTRONICS CO., LTD., Suwon-si (KR)

(72) Inventors: Jong-chool Lee, Gunpo-si (KR); Eun-ji Kim, Suwon-si (KR); Min-gon Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 14/278,693

(22) Filed: May 15, 2014

(65) Prior Publication Data

US 2015/0142917 A1 May 21, 2015

(30) Foreign Application Priority Data

Nov. 19, 2013 (KR) .......................... 10-2013-0140885

(51) Int. Cl.
  *G06F 15/16* (2006.01)
  *H04L 29/06* (2006.01)
  (Continued)

(52) U.S. Cl.
  CPC ...... *H04L 65/4084* (2013.01); *H04L 65/4092* (2013.01); *H04L 65/608* (2013.01);
  (Continued)

(58) Field of Classification Search
  CPC ..... H04L 12/24; H04L 29/06; H04L 12/1881; H04N 7/173; H04N 7/17318; H04N 5/76;
  (Continued)

(56) References Cited

U.S. PATENT DOCUMENTS 8,144,632 B1 * 3/2012 Chapweske ......... H04L 12/1881
                                            370/238
2002/0049833 A1    4/2002 Kikinis
                (Continued)

FOREIGN PATENT DOCUMENTS

EP        2 211 507 A1    7/2010

OTHER PUBLICATIONS

Search Report, Issued by the International Searching Authority, Dated Nov. 18, 2014, in counterpart International Application No. PCT/KR2014/006647.

(Continued)

*Primary Examiner* — Dustin Nguyen
(74) *Attorney, Agent, or Firm* — Sughrue Mion, PLLC

(57) ABSTRACT

A server, a user terminal apparatus, and a method for providing a streaming data service are disclosed. The method of providing streaming data to a user terminal apparatus from a server includes receiving a describe message from the user terminal apparatus via a real-time stream protocol scheme, transmitting a response message containing content execution information about at least one content of a streaming data service and content list information pre-stored in relation to at least one content stored in a storage medium to the user terminal apparatus when the describe message is received, and transmitting streaming data about content of the streaming data service or content stored in the storage medium to the user terminal apparatus when streaming data service request is received from the user terminal apparatus based on the response message.

24 Claims, 8 Drawing Sheets

(51) Int. Cl.
　　　*H04N 21/239*　　(2011.01)
　　　*H04N 21/437*　　(2011.01)
　　　*H04N 21/6437*　(2011.01)

(52) U.S. Cl.
　　　CPC ....... *H04N 21/2393* (2013.01); *H04N 21/437* (2013.01); *H04N 21/6437* (2013.01)

(58) Field of Classification Search
　　　CPC ... H04N 21/2387; G11B 27/005; H04W 4/10; G06F 21/10
　　　USPC .... 709/203, 236, 206, 217, 231; 725/14, 31; 370/396, 238; 726/4
　　　See application file for complete search history.

(56) References Cited

U.S. PATENT DOCUMENTS

| | | | | |
|---|---|---|---|---|
| 2003/0231637 | A1* | 12/2003 | Ishikawa | H04L 12/24 370/396 |
| 2003/0236912 | A1* | 12/2003 | Klemets | H04L 29/06 709/236 |
| 2007/0115345 | A1 | 5/2007 | Koh | |
| 2008/0250101 | A1* | 10/2008 | Tanaka | G11B 27/005 709/203 |
| 2009/0106389 | A1* | 4/2009 | Hakkarainen | H04W 4/10 709/217 |
| 2009/0197618 | A1 | 8/2009 | Ko et al. | |
| 2009/0300673 | A1* | 12/2009 | Bachet | H04N 7/17318 725/31 |
| 2011/0004665 | A1* | 1/2011 | Kim | H04N 5/76 709/206 |
| 2011/0252445 | A1 | 10/2011 | Ko et al. | |
| 2012/0011266 | A1* | 1/2012 | Avasarala | H04N 21/2387 709/231 |
| 2012/0311678 | A1* | 12/2012 | Nogami | G06F 21/10 726/4 |
| 2013/0111513 | A1* | 5/2013 | Gaude | H04N 7/173 725/14 |

OTHER PUBLICATIONS

Written Opinion, Issued by the International Searching Authority, Dated Nov. 18, 2014, in counterpart International Application No. PCT/KR2014/006647.

* cited by examiner

FIG. 4

Request DESCRIBE rtsp://192.168.128.5/
    CSeq: 5
    Accept: application/sdp
    <CRLF>

Response RTSP/1.0 200 OK
    CSeq: 5
    Content-Type: application/sdp
    Content-Base: rtsp://192.168.128.5/
    Content-Length: 724
    <CRLF>
    v=0
    o=_ 5678901234 7890123456 IN IP4 192.168.128.5
    s=SatIPServer:1 4
    t=0 0
    m=video 5004 RTP/AVP 33                  410
    c=IN IP4 239.0.0.8/5
411—  @=control:path=rtsp://Media/Movie/example.ts
413—  @=inactive
    m=video 5006 RTP/AVP 33
    c=IN IP4 239.0.0.9/5
    a=control:path=rtsp://192.168.128.5:554/Media/Movie/example-1.ts
    a=sendonly
    m=video 0 RTP/AVP 33
    c=IN IP4 0.0.0.0                        420
    a=control:stream=2
421—  @=fmtp:33 ver=1, 0;src=1;tune=1,240,1,7,12402,v,dvbs,,,,27500,34;pids=all
423—  @=sendonly
    m=video 5010 RTP/AVP 33
    c=IN IP4 239.0.0.11/5
    a=control:stream=3
    a=fmtp:33 ver=1, 0;src=2;tune=2,221,1,6,11758,h,dvbs2,8psk,off,25,27500,56;pids=all
    a=sendonly

FIG. 5

Request>
RECORD rtsp://192.168.128.1/?src=1&freq=12402&pol=v&msys=dvbs&mtype=qpsk&
sr=27500&fec=34&pids=0,16,50,104,166,1707&duration=10,180&sharable=yes RTSP/1.0
CSeq: 101
                                                            510           520

Response>
RTSP/1 . 0 200 OK
RecID: 1 —530
CSeq: 101

FIG. 6

```
Request DESCRIBE rtsp://192.168.128.5/
        CSeq: 5
        Accept: application/sdp
        <CRLF>

Response RTSP/1.0 200 OK
        CSeq: 5
        Content-Type: application/sdp
        Content-Base: rtsp://192.168.128.5/
        Content-Length: 724
        <CRLF>
        v=0
        o=_ 5678901234 7890123456 IN IP4 192.168.128.5
        s=SatIPServer:1 4
        t=0 0
        m=video 5004 RTP/AVP 33                                   610
        c=IN IP4 239.0.0.8/5
        a=control:path=rtsp://Media/Movie/20000107_11758_1_example.ts
        a=inactive
621—    @=UUID:2fac1234-31f9-11b4-a222-08002b34c003
623—    @=ServiceName:example
625—    @=Date:Fri,Jan 07 2000 00:48:14 Duration:40
        m=video 5006 RTP/AVP 33                           630
        c=IN IP4 239.0.0.9/5                                      620
        a=control:path=rtsp://Media/Movie/20000105_11758_2_example-1.ts
        a=sendonly
        a=UUID:2fac1234-31f9-11b4-a222-08002b34c003
        a=ServiceName:example
        a=Date:Wed, Jan 5 2000 10:40:00 Duration:80 m=video 0 RTP/AVP 33
        c=IN IP4 239.0.0.11/5
        a=control:stream=3
        a=fmtp:33 ver=1, 0;src=2;tuner=2,221,1,6,11758,h,dvbs2,8psk,off,25,27500,56;pids=all
        a=sendonly
```

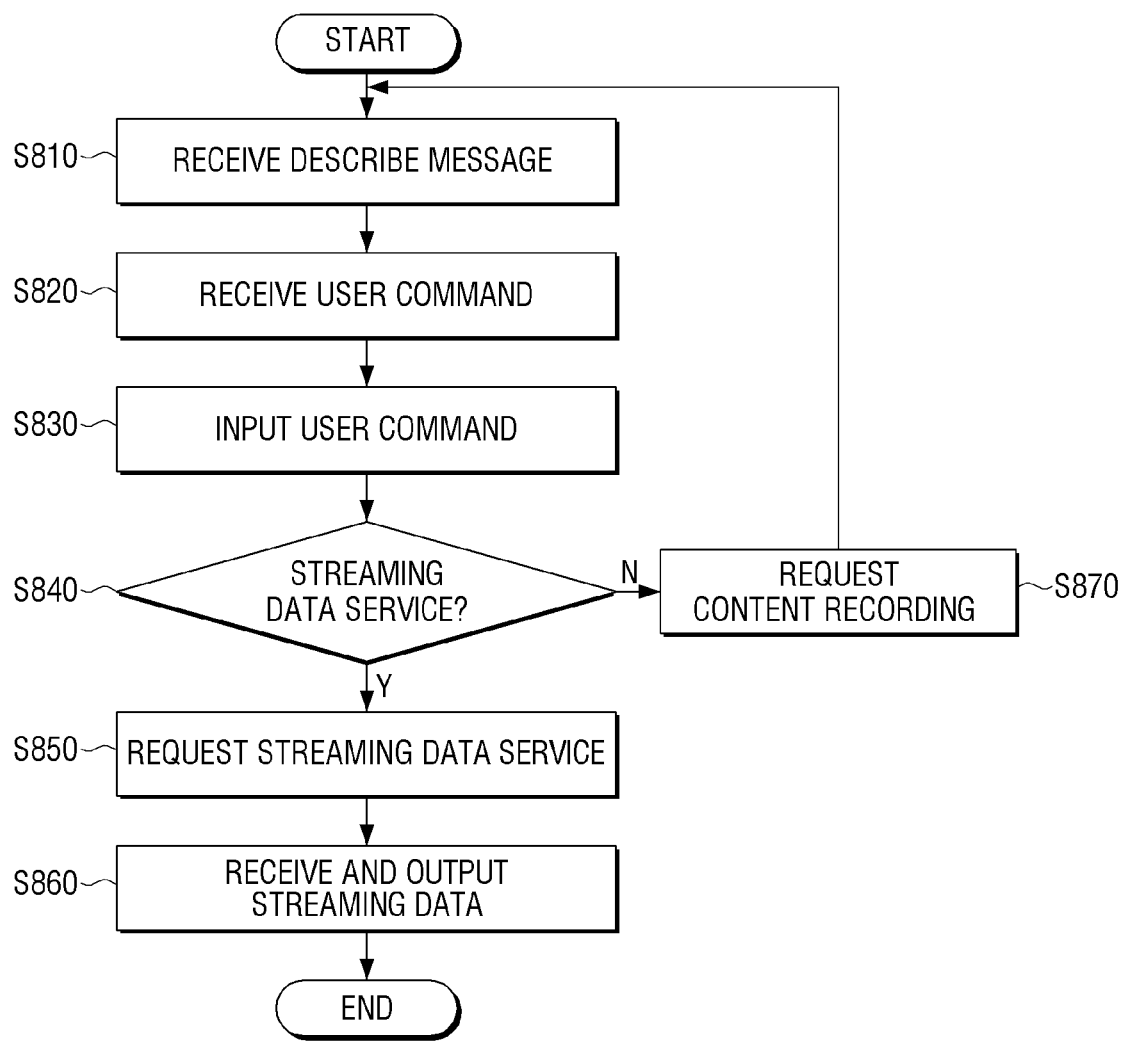

SERVER, USER TERMINAL APPARATUS, AND METHOD FOR PROVIDING STREAMING DATA SERVICE

CROSS-REFERENCE TO RELATED APPLICATIONS

This application claims priority from Korean Patent Application No. 10-2013-0140885, filed on Nov. 19, 2013, in the Korean Intellectual Property Office, the disclosure of which is incorporated herein by reference in its entirety.

BACKGROUND

1. Field

Apparatuses and methods consistent with exemplary embodiments relate to a server, a user terminal apparatus, and a method, for streaming a data service, and more particularly, to a server, a user terminal apparatus, and a method, for streaming a data service via a real-time stream protocol scheme.

2. Description of the Related Art

In general, a real-time stream protocol (RTSP) is a protocol for transmitting and receiving multimedia data such as audio/video in real time. A user terminal apparatus may receive and reproduce a content file in real time using an RTSP communication scheme.

Upon receiving a content file using the RTSP communication scheme, a user terminal apparatus may reproduce the content file without ensuring a separate storage space for storing the corresponding content file.

However, the user terminal apparatus receives only a content file that is streamed to another user terminal apparatus from a server via an RTSP communication scheme and does not receive a content file pre-stored in the server.

In addition, the user terminal apparatus may only control the streaming data to reproduce or temporarily pause the streaming data provided from a server via RTSP communication scheme, but is not able to perform other functions such as recording the corresponding content.

SUMMARY

Exemplary embodiments address the above disadvantages and other disadvantages not described above. Also, exemplary embodiments are not required to overcome the disadvantages described above, and an exemplary embodiment may not overcome any of the problems described above.

Exemplary embodiments provide a server that provides streaming data about content pre-stored in the server as well as streaming data about content provided from a tuned channel to a user terminal apparatus via a real-time stream protocol (RTSP) communication scheme.

Exemplary embodiments also provide a user terminal apparatus that performs various controls in relation to streaming data about content provided from a server via the RTSP communication scheme.

According to an aspect of an exemplary embodiment, a method of providing streaming data to a user terminal apparatus from a server includes receiving a describe message from the user terminal apparatus via a real-time stream protocol scheme, transmitting a response message containing content execution information about at least one content for providing a streaming data service and content list information pre-stored in relation to at least one content stored in a storage medium to the user terminal apparatus when the describe message is received, and transmitting streaming data about content for providing the streaming data service or content stored in the storage medium to the user terminal apparatus when streaming data service request is received from the user terminal apparatus based on the response message.

The content execution information may include at least one of channel information about content that is streaming data-served to another user terminal apparatus, packet identifier (PID) information, IP information, and identification information and sharing information about corresponding content, and the content list information may include identification information about the storage medium, and content information containing at least one of path information, type information, and identification information about at least one content stored in the storage medium.

The transmitting of the response message may include transmitting a response message including the content execution information, and content list information containing content information about remaining contents except for content that is not share-set to the user terminal apparatus based on sharing information of at least one content contained in the content list information.

The method may further include updating the content list information or generating content list information associated with the storage medium based on content stored in the storage medium according to whether content list information associated with the storage medium is stored, when a predetermine event occurs, wherein the predetermined event may include at least one of an event in which an external storage medium is physically connected and an event in which the server including an internal storage medium is booted.

The method may further include recording the content based on the received recording request information when recording request information about the content is received from the user terminal, generating recording information about the recorded content and storing the recording information in the storage medium, wherein the generating may include updating content list information pre-stored in relation to the storage medium or generating content list information associated with the storage medium when the recorded content is stored in the storage medium.

The recording request information may include at least one of channel information, recording time information, information of a storage medium for storing the content, and sharing information, and the recording information may include at least one of information contained in the recording request information, identification of the recorded content, information of time when the recording request information is received, and identification information and user information of a user terminal apparatus transmitting the recording request information The content list information may further include sharing information of at least one of contents stored in the storage medium, and the transmitting of the response message may include transmitting a response message including the content execution information, and content list information containing content information about remaining contents except for content that is not share-set to the user terminal apparatus based on sharing information of at least one content contained in the content list information.

The transmitting of the user terminal apparatus may include adding recording information to the response message and transmitting the response message to the user terminal apparatus according to whether the recording information is stored in the storage medium.

The method may further include deleting content stored in the storage medium or updating content information about the content based on a received user command when the user command is received from the user terminal apparatus based on the response message.

The transmitting of the streaming data may include controlling transmission of the streaming data based on a control command contained in the streaming data service request.

According to an aspect of another exemplary embodiment, a server for providing streaming data to a user terminal apparatus includes a communication unit configured to communicate with the user terminal apparatus via a real-time stream protocol scheme to receive a describe message, a storage unit configured to store content execution information about at least one content for providing a streaming data service and content list information in relation to at least one pre-stored content, and a controller configured to transmit a response message containing the content execution information and the content list information that are stored in the storage unit when the describe message is received, and to transmit streaming data about content for providing the streaming data service or content stored in the storage unit to the user terminal apparatus when streaming data service request is received from the user terminal apparatus based on the response message.

The content execution information may include at least one of channel information about content that is streaming data-served to another user terminal apparatus, packet identifier (PID) information, IP information, and identification information and sharing information about corresponding content, and the content list information may include identification information about the storage medium, and content information containing at least one of path information, type information, and identification information about at least one content stored in the storage medium.

The controller may transmit a response message including the content execution information, and content list information containing content information about remaining contents except for content that is not share-set to the user terminal apparatus based on sharing information of at least one content contained in the content list information.

The controller may update content list information stored in the storage unit or generates new content list information and stores the information in the storage unit, and the predetermined event may include at least one of an event in which an external storage medium is physically connected and an event in which the server including an internal storage medium is booted.

The controller may record the content based on the received recording request information when recording request information about the content is received from the user terminal, generate recording information about the recorded content and store the recording information in the storage medium, and update content list information stored in the storage unit or generate content list information associated with the recorded content and stores the information in the storage unit when the recorded content is stored.

The recording request information may include at least one of channel information, recording time information, information of a storage medium for storing the content, and sharing information, and the recording information may include at least one of information contained in the recording request information, identification of the recorded content, information of time when the recording request information is received, and identification information and user information of a user terminal apparatus transmitting the recording request information.

The content list information may further include sharing information of at least one of contents stored in the storage medium, and the controller may transmit a response message including the content execution information and content list information containing content information about remaining contents except for content that is not share-set to the user terminal apparatus based on the content execution information and sharing information of at least one content contained in the content list information.

The controller may add recording information to the response message and transmit the response message to the user terminal apparatus according to whether the recording information is stored in the storage unit.

The controller may delete content stored in the storage unit or an external storage medium physically connected thereto or update content information about the content based on a received user command when the user command is received from the user terminal apparatus based on the response message.

The controller may control transmission of the streaming data based on a control command contained in the streaming data service request According to an aspect of another exemplary embodiment, a method of using streaming data from a server by a user terminal apparatus includes transmitting a describe message to the server via a real-time stream protocol scheme, receiving a response message containing content execution information about at least one content for providing a streaming data service and content list information pre-stored in relation to at least one content stored in a storage medium from the server, requesting a streaming data service to the server based on the received response message, and receiving streaming data about content associated with the requested streaming data service from the server and outputting the streaming data.

The content execution information may include at least one of channel information about content that is streaming data-served to another user terminal apparatus, packet identifier (PID) information, IP information, and identification information and sharing information about corresponding content, and the content list information may include identification information about the storage medium, and content information containing at least one of path information about at least one content stored in the storage medium, type information, and identification information.

The method may further include generating recording request information about at least one content and transmitting the recording request information to the server based on content execution information contained in the received response message according to a user command, wherein the recording request information may include at least one of channel information, recording time information, information of a storage medium for storing the content, and sharing information.

The response message may further include recording information of recorded content among contents stored in the storage medium, and the recording information may include at least one of information contained in the recording request information, identification of the recorded content, information of time when the recording request information is received, and identification information and user information of a user terminal apparatus transmitting the recording request information.

According to an aspect of another exemplary embodiment, a user terminal apparatus includes a communication server configured to communicate with a server via a real-time stream protocol scheme to transmit a describe message, an output unit configured to output streaming data received from the server through the communication unit, and a controller configured to request a streaming data service based on the received response message when a response message is received from the server, and to control the output unit to output the received streaming data when streaming data corresponding to the streaming data service request is received, wherein the response message includes content execution information about at least one content for providing a streaming data service and pre-stored content list information in relation to at least one content stored in a storage medium of the server.

In addition, the content execution information may include at least one of channel information about content that is streaming data-served to another user terminal apparatus, packet identifier (PID) information, IP information, and identification information and sharing information about corresponding content, and the content list information may include identification information about the storage medium, and content information containing at least one of path information about at least one content stored in the storage medium, type information, and identification information.

The controller may generate recording request information about at least one content based on content execution information contained in the received response message and transmit the information to the server, according to a user command, and the recording request information may include at least one of channel information, recording time information, information of a storage medium for storing the content, and sharing information.

The response message may further include recording information of recorded content among contents stored in a storage medium of the server, and the recording information may include at least one of information contained in the recording request information, identification of the recorded content, information of time when the recording request information is received, and identification information and user information of a user terminal apparatus transmitting the recording request information.

A method of providing streaming data includes receiving a describe message of a real time streaming protocol, transmitting a response message comprising content execution information about a streaming data service and content list information about content stored on a server in response to receiving the describe message, receiving a streaming data service request based on the transmitted response message, and transmitting streaming data corresponding to the streaming data service or the content stored at the server based on the streaming data service request.

The content execution information may include at least one of channel information about content that is streaming data served to a user terminal apparatus, packet identifier (PID) information, IP information, and identification information and sharing information about the content, and the content list information may include identification information about a storage medium of the server, and content information including at least one of path information, type information, and identification information about the content stored on the server.

The content list information may further include sharing information of the content stored on the server. In addition, the response message may include the content execution information, and the content list information may include content information about content other than content that is not share set based on the sharing information of the content included in the content list information.

The method may further include receiving recording request information about the content, recording the content based on recording request information, and generating recording information about the recorded content and storing the recording information at the server.

The method may further include adding the recording information to the response message.

As described above, according to the various embodiments of the specification, the server may provide streaming data about content pre-stored in the server as well as streaming data about content provided from a tuned channel to a user terminal apparatus via a real-time stream protocol (RTSP) communication scheme. In addition, the user terminal apparatus may perform various controls in relation to streaming data about content provided from a server via an RTSP communication scheme.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which:

FIG. 4 is a first exemplary diagram of a response message transmitted to a user terminal apparatus from a server in relation to a describe message, according to an exemplary embodiment;

FIG. 5 is an exemplary diagram of a recording request message for a recording request about content by a user terminal apparatus, according to an exemplary embodiment;

FIG. 6 is a second exemplary diagram of a response message transmitted to a user terminal apparatus from a server in relation to a describe message, according to another exemplary embodiment;

FIG. 8 is a flowchart of a method of using a streaming data service by a user terminal apparatus according to an exemplary embodiment.

DETAILED DESCRIPTION OF THE EXEMPLARY EMBODIMENTS

Certain exemplary embodiments will now be described in greater detail with reference to the accompanying drawings.

Figure 1:
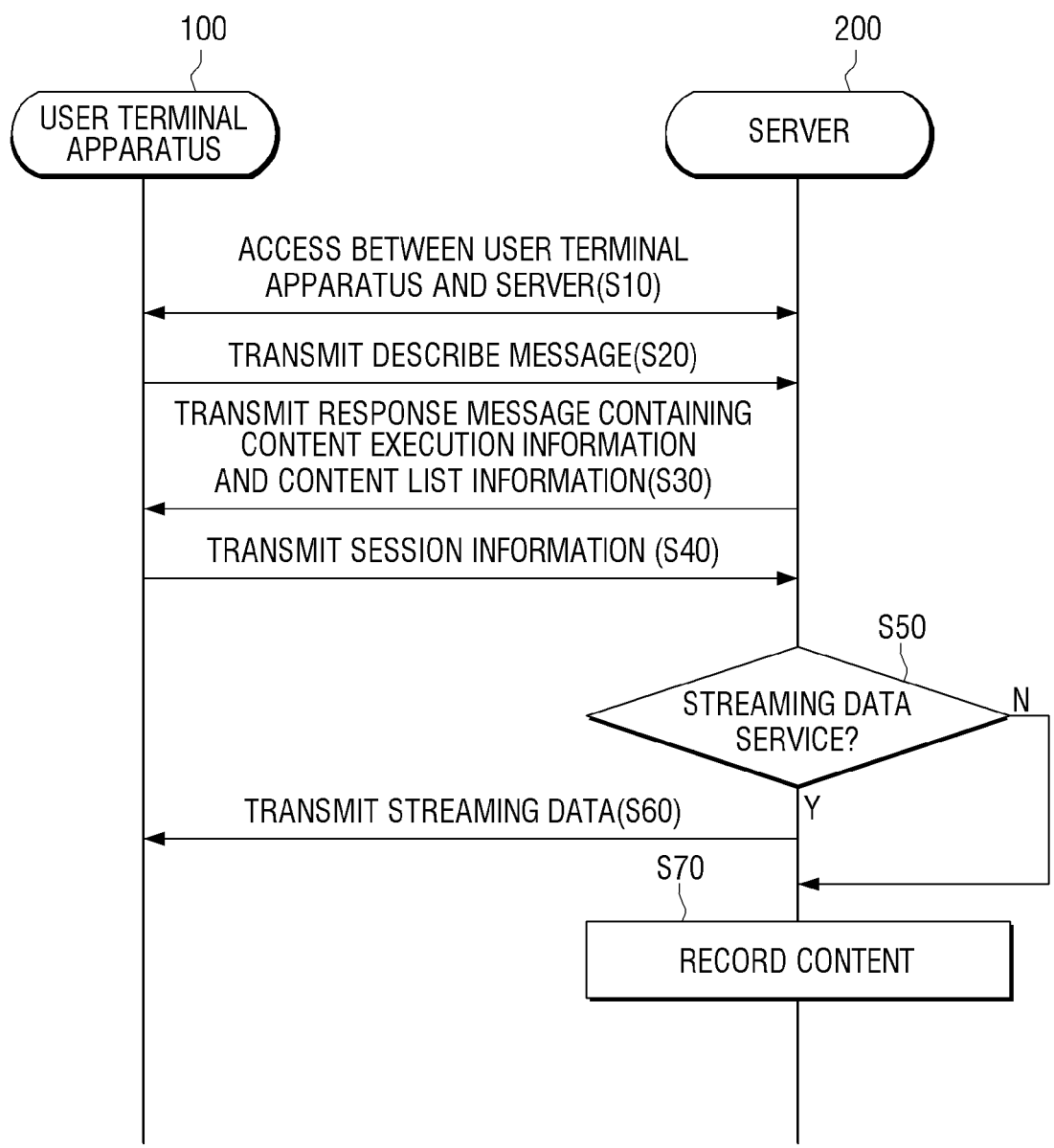
FIG. 1 is a diagram illustrating a procedure of providing a streaming data service to a user terminal apparatus from a server according to an exemplary embodiment.

FIG. 1 is a diagram illustrating a procedure of providing a streaming data service to a user terminal apparatus from a server 200 according to an exemplary embodiment.

As illustrated in FIG. 1, the user terminal apparatus 100 is a terminal apparatus that receives streaming data about content requested by a user from the server 200 and outputs the streaming data via wired or wireless communication with the server 200 such. An example of a user terminal may be a set-top box, computer, television, mobile phone, etc. The server 200 tunes a channel requested by the user terminal apparatus 100 among a terrestrial channel, a cable channel, and a satellite channel via a tuner, receives a broadcast signal about corresponding content, and transmits streaming data about the received broadcast signal to the user terminal apparatus 100.

The user terminal apparatus 100 performs access to the server 200 in order to receive a streaming data service from the server 200 (Operation S10). In detail, the user terminal apparatus 100 receives a transmit signal of the server 200, which is periodically transmitted. Then, the user terminal apparatus 100 transmits access request information containing Internet protocol (IP) information of a network of the user terminal apparatus 100 to server 200 in order to perform network access to the server 200 based on the signal transmitted from the server 200 according to the user request. In this case, the user terminal apparatus 100 may transmit access request information to the server 200 via a real-time streaming protocol (RTSP) scheme. However, exemplary embodiments are not limited thereto. The user terminal apparatus 100 may transmit the access request information to the server 200 via a communication protocol scheme such as TCP.

The server 200 that receives the access request information from the user terminal apparatus 100 may transmit a response message to the user terminal apparatus 100 based on the IP information contained in the corresponding access request information, thereby forming access or a connection between the user terminal apparatus 100 and the server 200. Likewise, when the access between the user terminal apparatus 100 and the server 200 is formed, the user terminal apparatus 100 transmits a describe message to the server 200 via an RTSP scheme (Operation S20).

Here, the describe message is a message for requesting a description of streaming data to be received by the user terminal apparatus 100.

The server 200 that receives the describe message transmits a response message containing content execution information about at least one content for providing a streaming data service and pre-stored content list information associated with at least one content stored in a storage medium to the user terminal apparatus 100 (Operation S30). Here, the content execution information may include at least one of channel information about content that is streaming data-served to another user terminal apparatus 100, packet identifier (PID) information, IP information, and sharing information. In addition, the content list information may include at least one of identification information about a storage medium, path information and type information of at least one content stored in each respective storage medium.

The user terminal apparatus 100 that receives the response message containing the content execution information and the content list information transmits session information about content that may be requested to be streaming data-served based on the content execution information and content list information contained in the received response message (Operation S40). Here, the session information may be information for receiving streaming data from the server 200 or information for requesting recording of content.

According to an exemplary embodiment, when the session information is streaming data service request related information, the session information may include at least one of protocol information, port information, type information of corresponding content, identification information, IP information, and control information about streaming data, for receiving streaming data about content via an RTSP scheme. When the session information is recording request information, the session information may include at least one of channel information of content, recording time information, information of a storage unit for storing the corresponding content, and sharing information.

Thus, the server 200 determines whether a user request is streaming data service request or recording request based on information contained in the session information (Operation S50). Based on a result of the determination, when the user request is a streaming data service request, the server 200 transmits content that is streaming data-served to the user terminal apparatus 100 or streaming data about content stored in a storage medium to the user terminal apparatus 100 based on the received session information (Operation S60). Accordingly, the user terminal apparatus 100 may decode streaming data received from the server 200 and output video and audio signals.

When the user request is a recording request, in the aforementioned operation S50, the server 200 performs recording on content based on the received session information to generate the recorded content and recording information about the corresponding content, and stores the recorded content and recording information in a storage medium (Operation S70). Then, when the recorded content is stored in the storage medium, the server 200 may update pre-generated content list information associated with the corresponding storage medium. Then, upon receiving the describe message from user terminal apparatus 100 in the aforementioned operation S20, the server 200 may transmit a response message containing content execution information and updated content list information to the user terminal apparatus 100.

Accordingly, information about content that is streaming data-served by the server 200 and content pre-stored in the server 200 is provided to a user via the user terminal apparatus 100, and thus, the user may use the content pre-stored in the server 200 as well as content that is streaming data-served in real time by the user terminal apparatus 100.

Thus far, a method of providing a streaming data service to the user terminal apparatus 100 from the server 200 has been described briefly. Hereinafter, the server 200 and the user terminal apparatus 100 will be described in more detail with reference to FIGS. 2 and 3.

Figure 2:
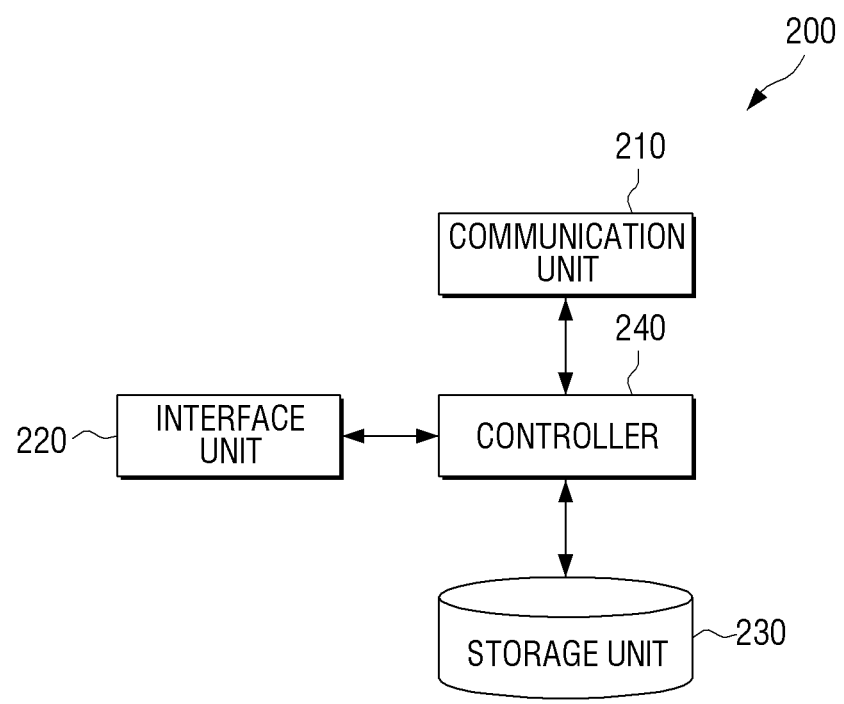
FIG. 2 is a block diagram of a server for providing streaming data according to an exemplary embodiment.

FIG. 2 is a block diagram of the server 200 for providing streaming data according to an exemplary embodiment.

As illustrated in FIG. 2, the server 200 includes a communication unit 210 (e.g., a communicator), an interface unit 220 (e.g., an interface), a storage unit 230 (e.g., a storage, memory, etc.), and a controller 240 (e.g., processor, microprocessor, cpu, etc.).

The communication unit 210 performs communication with the user terminal apparatus 100. In detail, the communication unit 210 may perform communication with the user terminal apparatus 100 according to various communication protocols such as a hypertext transfer protocol (HTTP), an extensible messaging and presence protocol (XMPP), a secure sockets layer (SSL), a file transfer protocol (FTP), content centric networking (CCN), or the like. However, exemplary embodiments are not limited thereto. The communication unit 210 may wireless-communicate with the user terminal apparatus 100 according to a radio communication standard such as wireless fidelity (Wi-Fi), 3rd generation (3G), 3rd generation partnership project (3GPP), long term evolution (LTE), etc. The communication unit 210 may receive a describe message via RTSP communication with the user terminal apparatus 100.

The interface unit 220 performs access to an external storage medium (not shown) such as a universal serial bus (USB) and receives content stored in the external storage medium (not shown) or stores content that may be recorded according to a request from the user terminal apparatus 100 in the external storage medium (not shown).

The storage unit 230 may be a storage medium that stores content execution information about at least one content for providing a streaming data service and content list information in relation to at least one pre-stored content. The storage unit 230 for storing the content list information may be an external storage medium formed within the server 200 or physically connected to the server 200.

The storage unit 230 may additionally store various programs required to operate the server 200. To this end, the storage unit 230 may include a read only memory (ROM) for storing a program for performing an operation of the controller 240, which will be described below, a random access memory (RAM) for temporarily storing various data based on the operation of the controller 240, etc. In addition, the storage unit 230 may further include an electrically erasable and programmable ROM (EEPROM), etc. for storing various reference data.

Upon receiving a describe message from the user terminal apparatus 100 through the communication unit 210, the controller 240 transmits a response message containing content execution information and content list information that are pre-stored in the storage unit 230.

Here, the content execution information may include at least one of channel information about content that is streaming data-served to another user terminal apparatus 100, PID information, IP information, and sharing information. The content list information may include identification information about the storage unit 230 or an external storage medium (not shown) and content information about content stored in the storage unit 230 or an external storage medium (not shown). In addition, the content information may include at least one of path information of at least one content stored in the storage unit 230 or an external storage medium (not shown), type information of the corresponding content, and identification information for identifying the corresponding content.

In detail, the server 200 may further include a tuner (not shown). The tuner (not shown) tunes a channel corresponding to streaming data service requested received from at least one of another user terminal apparatus 100 and receives a broadcast signal about content requested by a user of another user terminal apparatus 100, according to a control command of the controller 240. Upon receiving the broadcast signal, the controller 240 demodulates a broadcast signal pre-received through a demodulator (not shown) and divides broadcast data pre-demodulated by a demux (not shown) into audio/video data. Then, the controller 240 may transmit streaming data about the broadcast data divided into the audio/video data to another user terminal apparatus 100. In this case, the controller 240 stores content execution information that is streaming data-served to another user terminal apparatus 100 in the storage unit 230. Here, the content execution information may include at least one of channel information about content that is currently streaming data-served, PID information, IP information, and sharing information.

Thus, upon receiving a describe message from the user terminal apparatus 100, the controller 240 may transmit a response message containing content execution information pre-stored in the storage unit 230 to the user terminal apparatus 100 that has transmitted the describe message.

As described above, the storage unit 230 may store at least one content. When the content is stored in the storage unit 230, the controller 240 may generate content list information based on content stored in the storage unit 230 and store the content list information in the storage unit 230. When an external storage medium (not shown) that stores at least one content is physically connected to the controller 240 through the interface unit 220, the controller 240 may generate content list information based on content stored in an external storage medium (not shown) and store the content list information in the storage unit 230. That is, the controller 240 may store content list information that corresponds to each of the storage unit 230 and an external storage medium (not shown) and store the content list information in the storage unit 230.

According to an exemplary embodiment, content list information about content stored in the storage unit 230 may include identification information for identifying the storage unit 230 and content information about at least one content stored in the storage unit 230. Here, the content information may include at least one of path information about at least one content stored in the storage unit 230, type information of the corresponding content, and identification information indicating the corresponding content.

In addition, the content list information about content stored in an external storage medium (not shown) may include identification information for identifying the external storage medium (not shown) and content information about at least one content stored in the external storage medium (not shown). Here, the content information may include at least one of path information about at least one content stored in an external storage medium (not shown), type information of the corresponding content, and identification information indicating the corresponding content.

Thus, upon receiving a describe message from the user terminal apparatus 100, the controller 240 may generate a response message containing content execution information and content list information that are pre-stored in the storage unit 230 and transmit the response message to the user terminal apparatus 100.

Prior to transmission of the response message to the user terminal apparatus 100, the controller 240 may determine whether content is share-set based on sharing information of at least one content contained in the content list information. Based on a result of the determination, when there is content that is not share-set, the controller 240 may generate a response message containing content execution information and content list information including content information about remaining content except for the content that is not share-set and transmit the response message to the user terminal apparatus 100.

However, exemplary embodiments are not limited thereto. At least one of contents stored in the storage unit 230 or an external storage medium (not shown) may be share-set to be shared by only a specific user. For example, first content stored in the storage unit 230 may be non-share set. In this case, content information about the first content among content information containing the content list information generated in relation to the storage unit 230 may contain additional information associated with authority of the first content.

Thus, the controller 240 may generate a response message containing content execution information and content list information including share-set content information based on sharing information contained in content execution information and additional information contained in the content list information and transmit the response message to the user terminal apparatus 100.

Upon receiving session information generated based on the response message from the user terminal apparatus 100, the controller 240 may transmit streaming data about pre-stored content or record the content according to the received session information. As described above, the session information may be information for requesting to transmit streaming data about content that is currently served to the user terminal apparatus 100 or pre-stored content or information for recording specific content and storing the content in a storage medium (the storage unit 230 or an external storage medium (not shown)).

According to an exemplary embodiment, when the session information is streaming data service request related information, the session information may include at least one of protocol information, port information, type information of corresponding content, identification information, IP information, and control information about streaming data, for receiving streaming data about content via an RTSP scheme. When the session information is recording request information, the session information may include at least one of protocol information, port information, channel information of content, recording time information, information of a storage unit for storing the corresponding content, and sharing information, for receiving streaming data about content via an RTSP scheme.

As described above, when the session information received from the user terminal apparatus 100 is streaming data service request related information, the controller 240 transmits streaming data about content stored in the storage unit 230 or an external storage medium (not shown) to the user terminal apparatus 100 based on the protocol information, the port information, the type information about the corresponding content, the identification information, the IP information, and the control information, which are contained in the received session information.

In an exemplary embodiment, the session information that is streaming data service request related information may include protocol information, port information, type information about the corresponding content, identification information, IP information, and control information about "execution". In this case, the controller 240 may transmit streaming data about specific content to the user terminal apparatus 100 via an RTSP communication scheme based on information contained in the session information. While transmitting the streaming data, upon receiving the session information about "temporary pause" in relation to the corresponding content, the controller 240 may stop transmitting streaming data that is currently transmitted to the user terminal apparatus 100. Then, upon receiving the session information containing the control information about "execution" in relation to the corresponding content from the user terminal apparatus 100, the controller 240 may re-transmit data from streaming data corresponding to a point of time when transmission of streaming data is stopped.

When the session information received from the user terminal apparatus 100 is recording request information, the controller 240 records content requested by a user and stores the content in the storage unit 230 or an external storage medium (not shown) based on protocol information, port information, channel information about the corresponding content, recording time information, information of a storage unit for storing the corresponding content, and sharing information, which are contained in the received session information, in the storage unit 230 or an external storage medium. In addition, the controller 240 generates recording information about the recorded content and stores the recording information in a storage medium (the storage unit 230 or an external storage medium (not shown)) which stores the corresponding content.

Here, the recording information may include at least one of channel information about content, recording time information, information of a storage unit for storing the corresponding content, sharing information, identification information of the corresponding content, information of time when the recording request information is received, and identification information and user information of the user terminal apparatus 100 that transmits the recording request information.

Thus, upon receiving a describe message from the user terminal apparatus 100, the controller 240 transmits a response message containing content execution information and content list information to the user terminal apparatus 100, as described above. In this case, the controller 240 determines whether recording information about recorded content is stored among contents stored in a storage medium (the storage unit 230 or an external storage medium (not shown)). Based on a result of the determination, when the recording information is stored, the controller 240 may generate a response message containing recording information stored in the storage medium (the storage unit 230 or an external storage medium (not shown)) and transmit the response message to the user terminal apparatus 100 together with content execution information and content list information.

Thus, the user terminal apparatus 100 may generate and display content guide information based on the response message received from the server 200. Further, a user may receive an additional guide service about pre-stored content as well as request content that is currently streaming data-served or content stored in a storage medium (the storage unit 230 or an external storage medium (not shown)) based on the displayed content guide information.

Upon receiving a user command from the user terminal apparatus 100 based on the response message, the controller 240 may delete steaming data about at least one content stored in a storage medium (the storage unit 230 or an external storage medium (not shown)) or update content information about the corresponding content, based on the received user command. For example, the user command received from the user terminal apparatus 100 may refer to share-setting change for non-share set content. Upon receiving the user command, the controller 240 may update share setting of the non-share set content to share-set content based on the received user command.

According to another exemplary embodiment, when a predetermined event occurs, the controller 240 updates content list information stored in a storage medium (the storage unit 230 or an external storage medium (not shown)) or generates new content list information and stores the information in the storage unit 230. Here, the predetermined event may be at least one of an event in which an external storage medium (not shown) that stores content is physically connected through the interface unit 220 and an event in which the server 200 is booted. As described above, when recorded content is stored in a storage medium (the storage unit 230 or an external storage medium (not shown)), the controller 240 may update content list information stored in the storage unit 230 or generate content list information in relation to the recorded content and store the information in the storage unit 230.

Thus far, each component of the server 200 for providing a streaming data service to the user terminal apparatus 100 according to an exemplary embodiment has been described in detail. Hereinafter, each component of the user terminal apparatus 100 using a streaming data service for provided by the server 200 will be described in detail.

Figure 3:
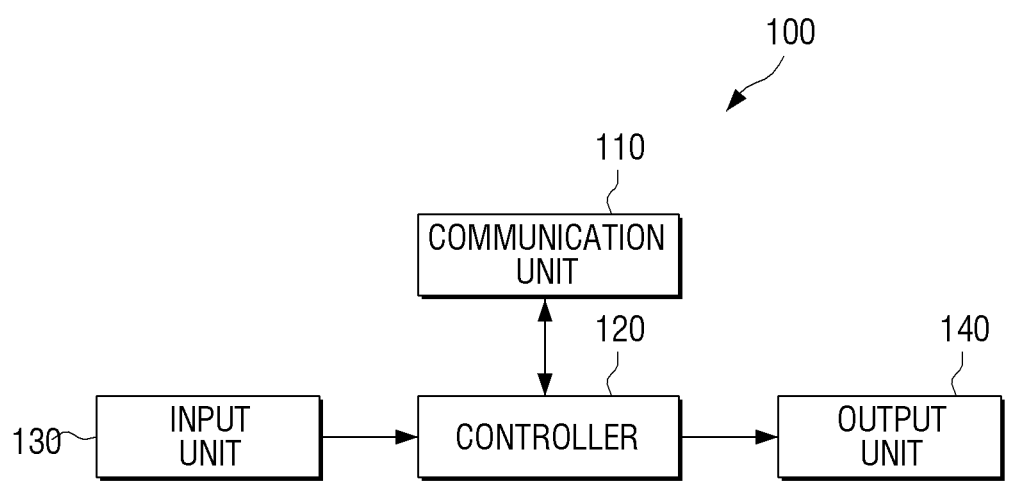
FIG. 3 is a block diagram of a user terminal apparatus according to an exemplary embodiment.

FIG. 3 is a block diagram of the user terminal apparatus 100 according to an exemplary embodiment.

As illustrated in FIG. 3, the user terminal apparatus 100 includes a communication unit 110 (e.g., a communicator), a controller 120, an input unit 130 (e.g., an input device), and an output unit 140 (e.g., an output device). The communication unit 110 communicates with the server 200 via an RTSP communication scheme to transmit a describe message. However, exemplary embodiments are not limited thereto. The communication unit 110 may communicate with the server 200 and another user terminal apparatus 100 according to various communication protocols such as a hypertext transfer protocol (HTTP), an extensible messaging and presence protocol (XMPP), a secure sockets layer (SSL), a file transfer protocol (FTP), content centric networking (CCN), or the like. In addition, the communication unit 110 may wireless-communicate with the server 200 and another user terminal apparatus 100 according to various communication standards such as wireless fidelity (Wi-Fi), 3rd generation (3G), 3rd generation partnership project (3GPP), long term evolution (LTE), etc.

The output unit 140 decodes streaming data received from the server 200 through the communication unit 110 to output audio/video signals. In this case, the output unit 140 may scale and output the decoded audio/video in the form to be output by the user terminal apparatus 100.

Upon receiving a response message from the server 200, the controller 120 may request a streaming data service about specific content or request recording of the corresponding content based on the received response message.

In detail, the response message received from the server 200 may include content execution information about at least one content for providing a streaming data service to another user terminal apparatus 100 and pre-stored content list information about at least one content stored in a storage medium of the server 200.

Here, the storage medium may be a storage medium installed within the server 200 or an external storage medium physically connected to the server 200. In addition, the content execution information may include content information containing at least one of channel information about content that is streaming data-served to another user terminal apparatus 100, PID information, IP information, identification information about the corresponding content, and sharing information.

Also, content list information may include identification information about the storage medium, and content information containing at least one of path information about at least one content stored in the storage medium, type information, and identification information.

Thus, the controller 120 may request a streaming data service about specific content or request recording of the corresponding content based on the response message containing the content execution information and the content list information.

According to an exemplary embodiment, while the response message is received from the server 200, a streaming data service request related user command may be input through the input unit 130. When the user command is input to the controller 120, the controller 120 generates session information about streaming data service request and transmits the session information to the server 200. As described above, the response message may include content execution information about at least one content for providing a streaming data service to another user terminal apparatus 100 and content list information pre-stored in relation to at least one content stored in a storage medium of the server 200.

Thus, the controller 120 may request a streaming data service to the server 200 based on the content execution information and the content list information, which are contained in the response message. That is, the controller 120 generates session information containing at least one of protocol information, port information, type information about the corresponding content, identification information, IP information, and control information about streaming data, for receiving streaming data about content to be received via an RTSP scheme, based on the response message received from the server 200, and transmits the generated session information to the server 200. Then, upon receiving streaming data corresponding to the streaming data service request, the controller 120 controls the output unit 140 to output the received streaming data. Further, the output unit 140 may decode the streaming data received from the server 200 to output audio/video signals.

According to another exemplary embodiment, while the response message is received from the server 200, a recording related user command about content may be input through the input unit 130. When the user command is input to the controller 120, the controller 120 generates session information for recording request of at least one content based on content execution information contained in the received response message and transmits the session information to the server 200. That is, the controller 120 generates recording request information containing at least one of channel information about content, recording time information, information of a storage medium for storing the corresponding content, and sharing information based on the content execution information contained in the received response message, and transmits the recording request information to the server 200.

Thus, the server 200 may record content based on the received recording request information to generate recorded content and recording information about the corresponding content based on the received recording request information and store the recorded content and recording information in a storage medium installed in the server 200 or an external storage medium physically connected to the server 200.

While the recorded content is stored in the storage medium installed in the server 200 or the external storage medium physically connected to the server 200, the server 200 may receive a describe message from the user terminal apparatus 100. In this case, the server 200 may further add recording information about the recorded content to the response message containing content execution information and content list information and may transmit the recording information to the user terminal apparatus 100.

Thus, the user terminal apparatus 100 may generate and display content guide information based on the response message received from the server 200. Further, a user may receive an additional guide service about content pre-stored in a storage medium as well as request content that is currently streaming data-served or content stored in a storage medium of the server 200 based on the displayed content guide information.

Hereinafter, the aforementioned describe message related response message and the recording request related transceiving message will be described in more detail.

FIG. 4 is a first exemplary diagram of a response message transmitted to the user terminal apparatus 100 from the server 200 in relation to a describe message, according to an exemplary embodiment.

As illustrated in FIG. 4, upon receiving a describe message from the user terminal apparatus 100, the server 200 may generate a response message containing content execution information 420 and content list information 410 and transmit the response message to the user terminal apparatus 100.

Here, the content list information 410 may include content information 411 about content stored in a storage medium of the server 200 and streaming data service state information 413. In detail, the content information 411 may include IP information, path information about content, type information, and identification information. The streaming data service state information 413 may contain information indicating that corresponding content is not streaming data-served.

In addition, the content execution information 420 may include content information 421 about content that is streaming data-served to another user terminal apparatus 100 and streaming data service state information 423. In detail, the content information 421 about streaming data-served content may include at least one of channel information about corresponding content, PID information, and IP information. The streaming data service state information 423 may include information indicating that corresponding content is currently streaming data-served. In addition, although separate reference numerals are not indicated in FIG. 4, the content execution information 420 may include at least one of protocol information, port information, and identification information, for transmitting streaming data about the corresponding content via an RTSP scheme.

FIG. 5 is an exemplary diagram of a recording request message for recording request about content by the user terminal apparatus 100, according to an exemplary embodiment.

As illustrated in FIG. 5, the user terminal apparatus 100 that transmits a describe message to the server 200 may receive a response message containing content execution information and content list information from the server 200, as described with reference to FIG. 4. Upon receiving the response message, the user terminal apparatus 100 generates a recording request message based on the content execution information contained in the received response message and transmits the recording request message to the server 200. As illustrated in FIG. 5, the recording request message may include time information 510 and sharing information 520, for recording corresponding content. In detail, the time information 510 is information indicating time for recording content requested by a user. As illustrated in FIG. 5, according to a user command, the time information 510 may be set as "duration=10,180". Here, 10 refers to a point of time for recording and 180 refers to a period of time for recording. That is, upon receiving a recording request message, the server 200 may record corresponding content for 180 minutes after 10 minutes elapse from a point of time of receiving the recording request message based on the received time information 510.

In addition, the sharing information 520 is information for setting whether recorded content is to be shared. As illustrated in FIG. 5, according to a user command, the sharing information 520 may be set as "sharable=yes". In this case, recorded content may be shared by another user. Although separate reference numerals are not indicated in FIG. 5, the recording request message may further include IP information, channel information about content to be recorded, and information about a storage medium for storing the corresponding content.

The server 200 generates a response message corresponding to the recording request message and transmits the response message to the user terminal apparatus 100. As illustrated in FIG. 5, upon receiving a recording request message from the user terminal apparatus 100, the server 200 may generate a response message containing identification information 530 about content to be recorded based on the received recording request message and transmit the response message to the user terminal apparatus 100.

FIG. 6 is a second exemplary diagram of a response message transmitted to the user terminal apparatus 100 from the server 200 in relation to a describe message, according to another exemplary embodiment.

As described with reference to FIG. 5, the server 200 records content requested by a user and stores the recorded content in a storage medium based on a recording request message received from the user terminal apparatus 100. In this case, the server 200 may generate recording information about the recorded content and store the recording information in a storage medium, which stores the corresponding content, together with the content.

While streaming data about the recorded content and the recording information about the corresponding content are stored in the storage medium, the server 200 may receive a describe message from the user terminal apparatus 100, as described with reference to FIG. 4. Upon receiving the describe message, the server 200 generates a response message containing content execution information 630, content list information 610, and recording information 620 about the recorded content, and transmits the response message to the user terminal apparatus 100.

As described above, the content list information 610 may be information indicating content stored in a storage medium of the server 200. The content execution information 630 may be information indicating content that is streaming data-served to another user terminal apparatus 100. In addition, the recording information 620 may be information indicating recorded content among contents stored in a storage medium of the server 200 and may include identification information 621 of recorded content, content information 623 about the recorded content, and recording time information 625 about the recorded content.

Thus, the user terminal apparatus 100 generate and display content guide information based on the response message received from the server 200. Further, a user may receive an additional guide service about pre-stored content as well as request content that is currently streaming data-served or content stored in a storage medium of the server 200 based on the displayed content guide information.

Hereinafter, a method of providing streaming data to the user terminal apparatus 100 from the server 200 according to an exemplary embodiment will be described in detail.

Figure 7:
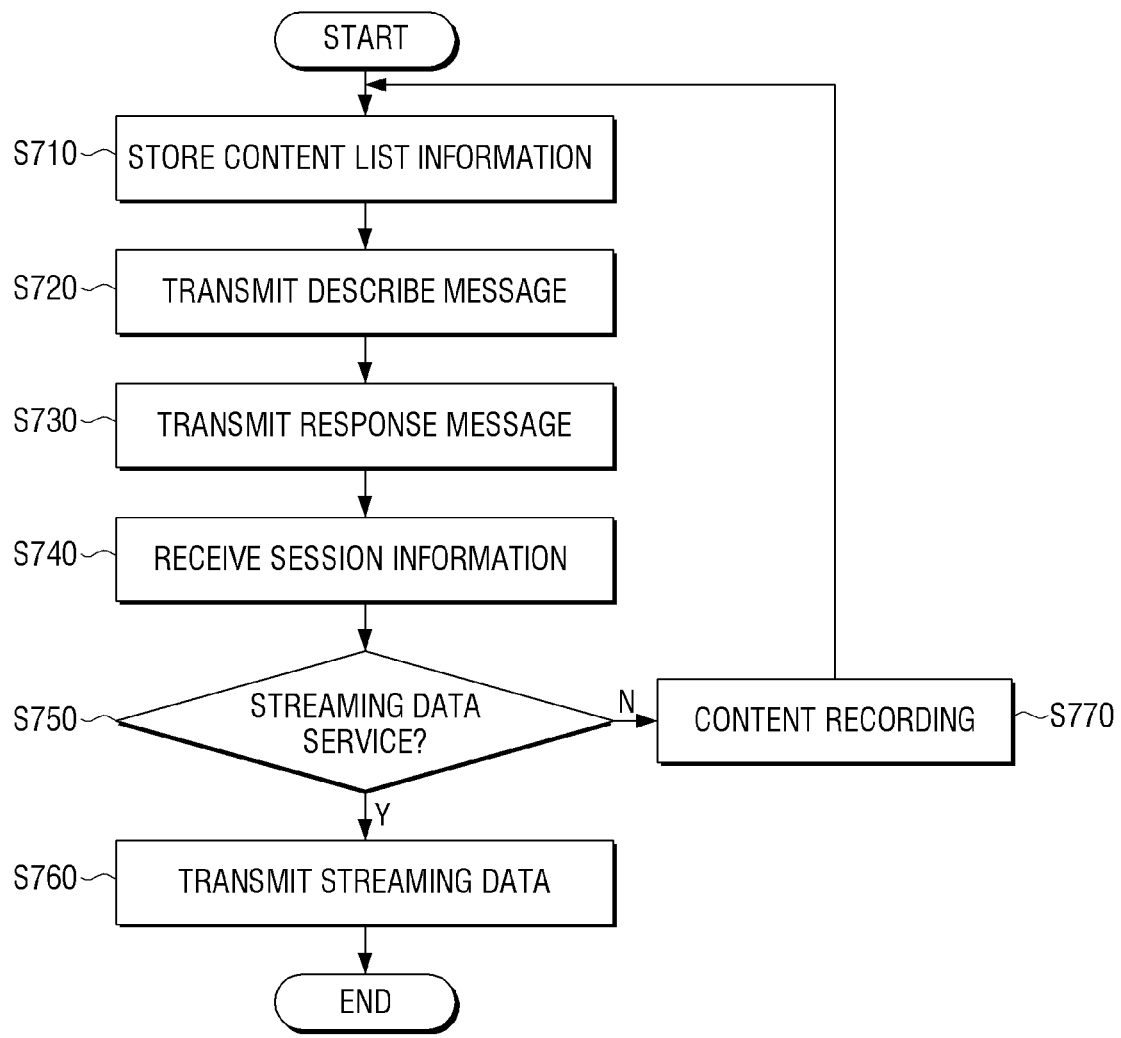
FIG. 7 is a flowchart of a method of providing streaming data to a user terminal apparatus from a server according to an exemplary embodiment.

FIG. 7 is a flowchart of a method of providing streaming data to the user terminal apparatus 100 from the server 200 according to an exemplary embodiment.

As illustrated in FIG. 7, the server 200 generates and stores content list information in relation to at least one content stored in a storage medium (Operation S710). Here, the storage medium may be a storage medium installed within the server 200 or an external storage medium physically connected to the server 200. Thus, the server 200 may generate content list information about each storage medium. The content list information may include content information containing at least one of identification information about the corresponding storage medium, path information about at least one content stored in the storage medium, type information, and identification information.

While the content list information is stored, upon receiving describe message from the user terminal apparatus 100 via an RTSP communication scheme, the server 200 generates a response message containing content execution information and pre-stored content list information and transmits the response message to the user terminal apparatus 100 (Operations 5720 and S730). Here, the content execution information may include at least one of channel information about content that is streaming data-served to another user terminal apparatus 100, PID information, IP information, and identification information and sharing information about the corresponding content.

Prior to transmission of the response message to the user terminal apparatus 100, the server 200 may determine whether content is share-set based on sharing information of at least one content contained in the content list information. Based on a result of the determination, when there is content that is not share-set, the server 200 may generate a response message containing content execution information and content list information including content information about remaining content except for the content that is not share-set and transmit the response message to the user terminal apparatus 100.

At least one of contents stored in the storage medium may be share-set to be shared by only a specific user. In this case, content information about the corresponding content may contain additional information associated with authority of the corresponding content. Thus, the server 200 may generate a response message containing content execution information and content list information including share-set content information based on sharing information contained in content execution information and additional information contained in the content list information and transmit the response message to the user terminal apparatus 100.

Then, upon receiving session information generated based on the response message from the user terminal apparatus 100, the server 200 determines whether the received session information is streaming data service related information (Operations 5740 and S750).

According to an exemplary embodiment, when the session information is streaming data service request related, the session information may include at least one of protocol information, port information, type information of corresponding content, identification information, IP information, and control information about streaming data, for receiving streaming data about content via an RTSP scheme. Thus, the server 200 may determine whether a user request is streaming data service request based on the received session information. Based on a result of the determination, when the user request is streaming data service request, the server 200 transmits streaming data about content stored in a storage medium to the user terminal apparatus 100 based on protocol information, port information, type information about the corresponding content, identification information, IP information, and control information, which are contained in the received session information (Operation S760).

The session information may include at least one of protocol information, port information, channel information about the corresponding content, recording time information, information of a storage medium for storing the corresponding content, and sharing information. In this case, the server 200 may determine that the user request is recording request based on the received session information. Thus, the server 200 records content requested by a user based on protocol information, port information, channel information about the corresponding content, recording time information, information about a storage medium for storing the corresponding content, and sharing information, which are contained in the received session information, and stores the recorded content in the storage medium (Operation S770). In this case, the server 200 may generate recording information about the recorded content and store the recording information in a storage medium that stores the corresponding content.

Here, the recording information may include at least one of channel information about content, recording time information, information of a storage unit for storing the corresponding content, sharing information, identification information of the corresponding content, information of time when the recording request information is received, and identification information and user information of the user terminal apparatus 100 that transmits the recording request information.

While the recorded content is stored in the storage medium, upon receiving the describe message from the user terminal apparatus 100, the server 200 may generate a response message containing the recording information stored in the storage medium and transmit the response message to the user terminal apparatus 100 together with content execution information and content list information.

Upon receiving a user command from the user terminal apparatus 100 based on the response message, the server 200 may delete at least content stored in the storage medium or update content information about the corresponding content, based on the received user command.

When a predetermined event occurs, the server 200 updates content list information stored in a storage medium or generates new content list information and stores the information. The predetermined event may be at least one of an event in which an external storage medium that stores content is physically connected and an event in which the server 200 is booted. As described above, when recorded content is stored in a storage medium, the server 200 may update pre-stored content list information or generate content list information in relation to the recorded content and stores the information.

Hereinafter, a method of using streaming data provided from the server 200 by the user terminal apparatus 100 according to an exemplary embodiment will be described in detail.

FIG. 8 is a flowchart of a method of using a streaming data service by the user terminal apparatus 100 according to an exemplary embodiment.

As illustrated in FIG. 8, when access between the user terminal apparatus 100 and the server 200 is formed, a describe message is transmitted to the server 200 (Operation S810). Then, upon receiving a response message from the server 200, the user terminal apparatus 100 receives a user command from a user based on the received response message (Operations 5820 and S830). Here, the response message may include content execution information and content list information. The content execution information may include at least one of channel information about content that is streaming data-served to another user terminal apparatus 100, PID information, IP information, identification information about the corresponding content, and sharing information. In addition, the content list information may include content information containing at least one of information about a storage medium, path information of at least one content stored in the corresponding storage medium, type information, and identification information.

Thus, the user terminal apparatus 100 may receive a user command from a user based on the response message. Upon receiving the user command, the user terminal apparatus 100 determines whether the user command is streaming data service request or recording request based on the input user command (Operation S840).

Based on a result of the determination, when the user command is streaming data service request, the user terminal apparatus 100 requests a streaming data service to the server 200 based on the user command input from the user (Operation S850). In detail, the user terminal apparatus 100 generates session information containing at least one of protocol information, port information, type information of corresponding content, identification information, IP information, and control information about streaming data, for receiving streaming data about content to be received, based on the received response message, and transmits the generated information to the server 200.

Then, upon receiving streaming data corresponding to the streaming data service request, the user terminal apparatus 100 decodes the received streaming data to output audio/video signals (Operation S860).

When the user command is recording request command in the aforementioned operation S840, the user terminal apparatus 100 requests recording of content requested by the user to the server 200 based on the user command input from the user (Operation S870). In detail, the user terminal apparatus 100 generates session information for recording request of at least one content based on the content execution information contained in the response message and transmits the session information to the server 200. That is, the user terminal apparatus 100 may generate recording request information containing at least one of channel information about content, recording time information, information of a storage medium for storing the corresponding content, and sharing information based on the content execution information contained in the received response message, and transmit the recording request information to the server 200.

Thus, the server 200 transmits a response message corresponding to the recording request information to the user terminal apparatus 100. In addition, the server 200 may record content based on the recording request information received from the user terminal apparatus 100 to generate the recorded content and recording information about the corresponding content and store the recorded content and recording information in a storage medium installed in the server 200 or an external storage medium physically connected to the server 200.

While the recorded content is stored in the storage medium installed in the server 200 or the external storage medium physically connected to the server 200, the server 200 may receive a describe message from the user terminal apparatus 100. In this case, the server 200 may further add recording information about the recorded content to the response message containing content execution information and content list information and may transmit the recording information to the user terminal apparatus 100.

Thus, the user terminal apparatus 100 may generate and display content guide information based on the response message received from the server 200. Further, a user may receive an additional guide service about content pre-stored in a storage medium as well as request content that is currently streaming data-served or content stored in a storage medium of the server 200 based on the displayed content guide information.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of providing streaming data to a user terminal apparatus from a server, the method comprising:
receiving a describe message from the user terminal apparatus via a real-time stream protocol scheme;
transmitting a response message comprising content execution information about at least one content of a streaming data service and pre-stored content list information corresponding to at least one content stored in a storage medium to the user terminal apparatus from the server, in response to receiving the describe message; and
transmitting streaming data about content of the streaming data service or content stored in the storage medium to the user terminal apparatus in response to receiving a streaming data service request from the user terminal apparatus based on the response message,
wherein the transmitting of the response message comprises transmitting a response message comprising the content execution information, and the content list information containing content information about remaining contents except for content that is not shareset to the user terminal apparatus based on sharing information of at least one content included with the content list information.

2. The method as claimed in claim 1, wherein the content execution information comprises at least one of channel information about content that is streaming data-served to another user terminal apparatus, packet identifier (PID) information, IP information, and identification information and sharing information about the content, and
wherein the content list information comprises identification information about the storage medium, and content information containing at least one of path information, type information, and identification information about the at least one content stored in the storage medium.

3. The method as claimed in claim 1, further comprising updating the content list information or generating new content list information associated with the storage medium based on content stored in the storage medium according to whether content list information associated with the storage medium is stored in response to a predetermined event,
wherein the predetermined event comprises at least one of an event in which an external storage medium is physically connected and an event in which the server comprising an internal storage medium is booted.

4. The method as claimed in claim 3, further comprising recording the content based on recording request information in response to the recording request information about the content being received from the user terminal; and
generating recording information about the recorded content and storing the recording information in the storage medium,
wherein the generating comprises updating the pre-stored content list information corresponding to the storage medium or generating new content list information associated with the storage medium in response to the recorded content being stored in the storage medium.

5. The method as claimed in claim 4, wherein the recording request information comprises at least one of channel information, recording time information, information about a storage medium for storing the content, and sharing information, and
  wherein the recording information comprises at least one of information included with the recording request information, identification of the recorded content, information about a time when the recording request information is received, and identification information and user information about a user terminal apparatus transmitting the recording request information.

6. The method as claimed in claim 5, wherein the content list information further comprises sharing information about at least one of contents stored in the storage medium.

7. The method as claimed in claim 5, wherein the transmitting of the user terminal apparatus comprises adding the recording information to the response message and transmitting the response message to the user terminal apparatus according to whether the recording information is stored in the storage medium.

8. The method as claimed in claim 2, further comprising deleting content stored in the storage medium or updating the content information based on a user command in response to the user command being received from the user terminal apparatus based on the response message.

9. The method as claimed in claim 1, wherein the transmitting of the streaming data comprises controlling transmission of the streaming data based on a control command included with the streaming data service request.

10. A server comprising a processor and memory for providing streaming data to a user terminal apparatus, the server comprising:
  a communicator interface configured to communicate with the user terminal apparatus via a real-time stream protocol scheme to receive a describe message;
  a storage configured to store content execution information about at least one content of a streaming data service and content list information corresponding to at least one pre-stored content; and
  a controller configured to transmit a response message comprising the content execution information and the content list information that are stored in the storage in response to receiving the describe message, and to transmit streaming data about content of the streaming data service or content stored in the storage to the user terminal apparatus from the server, in response to receiving a streaming data service request from the user terminal apparatus based on the response message,
  wherein the controller transmits a response message comprising the content execution information, and the content list information containing content information about remaining contents except for content that is not share-set to the user terminal apparatus based on sharing information of the at least one content included with the content list information.

11. The server as claimed in claim 10, wherein the content execution information comprises at least one of channel information about content that is streaming data-served to another user terminal apparatus, packet identifier (PID) information, IP information, and identification information and sharing information about the content, and
  wherein the content list information comprises identification information about the storage medium, and content information containing at least one of path information, type information, and identification information about the at least one content stored in the storage medium.

12. The server as claimed in claim 10, wherein the controller updates content list information stored in the storage or generates new content list information and stores the information in the storage, and
  wherein the predetermined event comprises at least one of an event in which an external storage medium is physically connected and an event in which the server comprising an internal storage medium is booted.

13. The server as claimed in claim 12, wherein the controller records the content based on recording request information in response to recording request information about the content being received from the user terminal, generates recording information about the recorded content and stores the recording information in the storage medium, and updates the content list information stored in the storage or generates new content list information associated with the recorded content and stores the information in the storage in response to the recorded content being stored.

14. The server as claimed in claim 13, wherein
  the recording request information comprises at least one of channel information, recording time information, information about a storage medium for storing the content, and sharing information, and
  wherein the recording information comprises at least one of information included with the recording request information, identification of the recorded content, information about a time when the recording request information is received, and identification information and user information about a user terminal apparatus transmitting the recording request information.

15. The server as claimed in claim 14, wherein the content list information further comprises sharing information about at least one of contents stored in the storage medium.

16. The server as claimed in claim 14, wherein the controller adds the recording information to the response message and transmits the response message to the user terminal apparatus according to whether the recording information is stored in the storage.

17. The server as claimed in claim 11, wherein the controller deletes content stored in the storage or an external storage medium physically connected to the server or updates the content information about the content based on a user command in response to the user command being received from the user terminal apparatus based on the response message.

18. The server as claimed in claim 10, wherein the controller controls transmission of the streaming data based on a control command included with the streaming data service request.

19. A method of using streaming data from a server by a user terminal apparatus, the method comprising:
  transmitting a describe message to the server via a real-time stream protocol scheme;
  receiving a response message containing content execution information about at least one content of a streaming data service and pre-stored content list information containing content information about remaining contents except for content that is not share-set to the user terminal based on sharing information of at least one content included with the content list information, from the server;
  requesting a streaming data service from the server based on the received response message;
  receiving streaming data about content associated with the requested streaming data service from the server and outputting the streaming data; and generating recording request information about at least one content and transmitting the recording request information to the server based on content execution information included with the received response message according to a user command, wherein the recording request information comprises at least one of channel information, recording time information, information of a storage medium for storing the content, and sharing information.

20. The method as claimed in claim 19, wherein the content execution information comprises at least one of channel information about content that is streaming data-served to another user terminal apparatus, packet identifier (PID) information, IP information, and identification information and sharing information about corresponding content, and wherein the content list information comprises identification information about the storage medium, and content information containing at least one of path information about at least one content stored in the storage medium, type information, and identification information.

21. The method as claimed in claim 19, wherein the response message further comprises recording information of recorded content among contents stored in the storage medium, and wherein the recording information comprises at least one of information included with the recording request information, identification of the recorded content, information of time in response to the recording request information being received, and identification information and user information of a user terminal apparatus transmitting the recording request information.

22. A user terminal apparatus comprising a processor and a memory, the user terminal apparatus further comprising:

a communication server configured to communicate with a server via a real-time stream protocol scheme to transmit a describe message;

an output interface configured to output streaming data received from the server through a communicator; and a controller configured to request a streaming data service based on a response message in response to the response message being received from the server, and to control the output to output the received streaming data in response to streaming data corresponding to the streaming data service request being received, wherein the response message comprises content execution information about at least one content of a streaming data service and pre-stored content list information containing content information about remaining contents except for content that is not share-set to the user terminal based on sharing information of at least one content included with the content list information, wherein the controller generates recording request information about at least one content based on content execution information included with the received response message and transmits the information to the server, according to a user command, and wherein the recording request information comprises at least one of channel information, recording time information, information of a storage medium for storing the content, and sharing information.

23. The user terminal apparatus as claimed in claim 22, wherein the content execution information comprises at least one of channel information about content that is streaming data-served to another user terminal apparatus, packet identifier (PID) information, IP information, and identification information and sharing information about corresponding content, and wherein the content list information comprises identification information about the storage medium, and content information containing at least one of path information about at least one content stored in the storage medium, type information, and identification information.

24. The user terminal apparatus as claimed in claim 23, wherein the response message further comprises recording information of recorded content among contents stored in a storage medium of the server, and wherein the recording information comprises at least one of information included with the recording request information, identification of the recorded content, information of time in response to the recording request information being received, and identification information and user information of a user terminal apparatus transmitting the recording request information.

* * * * *